US012582564B2

(12) United States Patent     (10) Patent No.:   US 12,582,564 B2

Moe et al.     (45) Date of Patent:    Mar. 24, 2026

(54) MULTI-USE AIRCRAFT MONUMENTS WITH WHEELCHAIR ACCOMMODATIONS

(71) Applicant: B/E Aerospace, Inc., Winston-Salem, NC (US)

(72) Inventors: Daniel N. Moe, Mukilteo, WA (US); Mark B. Dowty, Rural Hall, NC (US); Glenn A. Johnson, Rural Hall, NC (US); Jefferey M. McKee, Duvall, WA (US); Shawn W. Raybell, Maple Valley, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 363 days.

(21) Appl. No.: 18/367,041

(22) Filed: Sep. 12, 2023

(65) Prior Publication Data

US 2024/0091083 A1     Mar. 21, 2024

Related U.S. Application Data

(60) Provisional application No. 63/407,062, filed on Sep. 15, 2022.

(51) Int. Cl.
A61G 3/00      (2006.01)
A61G 3/08      (2006.01)
(Continued)

(52) U.S. Cl.
CPC ............ A61G 3/0808 (2013.01); B64D 11/04 (2013.01); B64D 2011/0046 (2013.01)

(58) Field of Classification Search
CPC .. A64D 2011/0046; A64D 11/04; A61G 3/08; A61G 3/0808
(Continued)

(56) References Cited

U.S. PATENT DOCUMENTS 4,266,822 A    5/1981   Barecki et al.
4,492,403 A    1/1985   Blomgren et al.
(Continued)

FOREIGN PATENT DOCUMENTS

CA       2737577 C    2/2019
DE      29924487 U1    6/2003
(Continued)

OTHER PUBLICATIONS

Extended European Search Report dated Jan. 29, 2024; European Application No. 23197706.7.

*Primary Examiner* — Steven O Douglas
(74) *Attorney, Agent, or Firm* — Suiter Swantz IP

(57) ABSTRACT

Disclosed are embodiments of monuments for installation in an aircraft passenger cabin. Each monument is multi-use in that the monument serves to accommodate a wheelchair and provide at least one additional function. In embodiments, the monument includes an interior space dedicated for receiving and positioning a wheelchair in an unfolded state, for instance an occupied wheelchair during taxi-takeoff, and landing (TTOL) and during flight. In embodiments, the monuments include storage compartments, direct access to an exterior window, tray table assemblies, etc. In embodiments, the monuments are configured to be positioned adjacent to at least one aisle for accessibility, and to a seat row including a passenger seat reserved for a caregiver. The monuments disclosed herein enhance the travel experience for a passenger with reduced mobilities (PRM), as well as increase flexibility in cabin designs.

20 Claims, 13 Drawing Sheets

(51) Int. Cl.
  *B64D 11/04*        (2006.01)
  *B64D 11/00*        (2006.01)

(58) Field of Classification Search
  USPC ............................................................ 410/7
  See application file for complete search history.

(56)                    References Cited

U.S. PATENT DOCUMENTS

| | | | |
|---|---|---|---|
| 6,113,325 | A | 9/2000 | Craft |
| 6,615,421 | B2 | 9/2003 | Itakura |
| 7,866,603 | B2 | 1/2011 | Cooper et al. |
| 8,047,467 | B2 | 11/2011 | Erickson et al. |
| 9,045,231 | B2 | 6/2015 | Swain |
| 9,051,052 | B2 | 6/2015 | Boren |
| 9,139,303 | B2 | 9/2015 | Bechtold et al. |
| 9,180,969 | B2 | 11/2015 | Kunze et al. |
| 9,308,997 | B2 | 4/2016 | Scown et al. |
| 9,688,407 | B2 | 6/2017 | McIntosh |
| 9,708,062 | B2 | 7/2017 | Grant et al. |
| 9,714,094 | B2 | 7/2017 | Ivester et al. |
| 10,287,016 | B2 | 5/2019 | Seibt |
| 10,426,674 | B2 | 10/2019 | Bijl et al. |
| 10,870,489 | B2 | 12/2020 | Dowty et al. |
| 10,933,968 | B2 * | 3/2021 | Heidtmann ............ B64D 11/04 |
| 10,953,987 | B2 | 3/2021 | Johnson et al. |
| 11,618,570 | B2 | 4/2023 | Roeder |

| | | | |
|---|---|---|---|
| 2012/0048998 | A1 | 3/2012 | Schliwa et al. |
| 2012/0261509 | A1 | 10/2012 | Grant et al. |
| 2013/0123075 | A1 | 5/2013 | Hmelnitski |
| 2013/0280002 | A1 | 10/2013 | Girardin et al. |
| 2014/0123571 | A1 * | 5/2014 | Swain ................ B64D 11/0023 |
| | | | 29/401.1 |
| 2014/0291445 | A1 | 10/2014 | Brauer et al. |
| 2014/0360099 | A1 | 12/2014 | McIntosh |
| 2016/0039522 | A1 | 2/2016 | Koyama et al. |
| 2018/0251222 | A1 | 9/2018 | Banfield et al. |
| 2019/0193859 | A1 | 6/2019 | Waldheuer et al. |
| 2019/0233117 | A1 | 8/2019 | Dowty et al. |
| 2019/0248495 | A1 | 8/2019 | Seibt |
| 2019/0359336 | A1 | 11/2019 | Hough et al. |
| 2020/0039626 | A1 | 2/2020 | Johnson et al. |
| 2021/0276716 | A1 | 9/2021 | Nicholas et al. |
| 2023/0257119 | A1 * | 8/2023 | Johnson ............ B64D 11/0606 |
| | | | 244/118.5 |

FOREIGN PATENT DOCUMENTS

| | | |
|---|---|---|
| EP | 2974960 A1 | 1/2016 |
| EP | 3873311 A1 | 9/2021 |
| WO | 2014201397 A1 | 12/2014 |
| WO | 2016157081 A1 | 10/2016 |
| WO | 2020092325 A1 | 5/2020 |
| WO | 2021040615 A1 | 3/2021 |

* cited by examiner

MULTI-USE AIRCRAFT MONUMENTS WITH WHEELCHAIR ACCOMMODATIONS

RELATED APPLICATION AND INCORPORATION BY REFERENCE

This nonprovisional application claims the benefit of priority of U.S. Provisional Application No. 63/407,062 filed Sep. 15, 2022, for MULTI-USE AIRCRAFT MONU-MENTS WITH WHEELCHAIR ACCOMMODATIONS, which is hereby incorporated by reference in its entirety.

TECHNICAL FIELD AND BACKGROUND

The present disclosure relates generally to provisions for a passenger with reduced mobilities (PRM) in an aircraft passenger cabin, and more particularly, to multi-use aircraft monuments including interior space dedicated for accom-modating a wheelchair.

Aircraft passenger cabins include equipment for serving the needs of traveling passengers. Equipment in a passenger cabin is typically positioned relative to other equipment, aisles, exits, emergency exits, etc., for accessibility and convenience of use. Each piece of equipment in a passenger cabin serves a primary function, such as seating, food and beverage preparation, stowage, etc.

While most passengers are able to board a plane on their own and make use of a standard passenger seat, a PRM requires special boarding procedures and accommodations. For example, a PRM confined to a wheelchair may be transferred from their own wheelchair to a specialized transfer wheelchair dimensioned to traverse a narrow lon-gitudinal aisle. When arrived at their seat, a PRM may be transferred again from the transfer wheelchair to a taxi, take-off, and landing (TTOL) compliant seat, while their own wheelchair is collapsed and stowed in another location in the aircraft, typically outside of the passenger cabin. Passenger transfers are not only time consuming, but are disruptive to a PRM, require trained personnel, and invite injury to those involved in the transfer process. In addition, TTOL compliant seats may not be able to accommodate the particular needs of a PRM.

A goal of cabin designers is to provide a similar travel experience for all passengers. While seating accommoda-tions, comfort levels, and passenger amenities can be made relatively consistent for most passengers, current cabin configurations do not provide the same travel experience for a PRM.

Therefore, what is needed are equipment solutions that integrate into a conventional passenger cabin configuration that enhance the travel experience for a PRM, without impacting the travel experience of others and the ability of the cabin crew to serve all passengers.

BRIEF SUMMARY

According to one aspect, the present disclosure is directed to a monument for installation in an aircraft passenger cabin having a floor, a ceiling, an outside wall, and a longitudinal aisle. In embodiments, the monument includes a housing configured to extend from the floor upwardly toward the ceiling, and from the outside wall toward the longitudinal aisle. An interior space is formed in the housing and is defined by a first interior wall positioned adjacent to the outside wall, a second interior wall positioned adjacent to the longitudinal aisle, and an interior ceiling positioned adjacent to the ceiling. The interior space extends from a first end of the housing to a second end of the housing, and the interior space is dimensioned to receive a wheelchair in an unfolded condition. The monument further includes at least one entrance into the interior space through at least one of the first end of the housing and the second end of the housing. In embodiments, a securement assembly is posi-tionable on the floor configured to secure the wheelchair in place within the interior space. The housing further includes at least one storage compartment for use by a flight crew.

In at least some embodiments, the first interior wall defines an opening to a window positioned in the outside wall.

In at least some embodiments, the at least one storage compartment includes at least one first storage compartment positioned in a space formed between the second interior wall and the longitudinal aisle, the at least one first storage compartment accessible from at least one of the first end and the second end of the housing, and at least one second storage compartment positioned in a space formed between the interior ceiling and the ceiling, the at least one second storage compartment accessible from the longitudinal aisle.

In at least some embodiments, the monument further includes a countertop positioned atop the at least one first storage compartment, the countertop spaced below the at least one second storage compartment, and the countertop accessible from the longitudinal aisle.

In at least some embodiments, none of the at least one first storage compartment, the at least one second storage com-partment, and the countertop are accessible from within the interior space.

In at least some embodiments, the at least one first storage compartment is dimensioned to receive a galley cart.

In at least some embodiments, the at least one storage compartment includes at least one first storage compartment positioned in a space formed between the first interior wall and the outside wall, the at least one first storage compart-ment being accessible from within the interior space, and at least one second storage compartment positioned in the space formed between the interior ceiling and the ceiling, the at least one second storage compartment accessible from the longitudinal aisle and at least one of the first end and the second end of the monument.

In at least some embodiments, the monument further includes a first entrance positioned at the first end of the housing, a first door positioned at the first entrance, a second entrance positioned at the second end of the housing, and a second door positioned at the second entrance.

In at least some embodiments, the second interior wall includes a window open from the interior space to the longitudinal aisle.

In at least some embodiments, the monument further includes a tray table assembly positioned in the interior space, the tray table assembly including a rail mounted to one the first interior wall and the second interior wall, and at least one deployable tray table mounted to the rail.

In at least some embodiments, the interior space is dimen-sioned to receive at least two wheelchairs each in a folded condition.

According to another aspect, the present disclosure is directed to a monument for installation in an aircraft pas-senger cabin having a floor, a ceiling, an outside wall, and a longitudinal aisle. In embodiments, the monument includes a housing configured to extend from the floor upwardly toward the ceiling, and from the outside wall toward the longitudinal aisle. The housing includes an interior space formed in the housing defined by a first interior wall positioned adjacent to the outside wall, a second interior wall positioned adjacent to the longitudinal aisle, and an interior ceiling positioned adjacent to the ceiling, the interior space extending from a first end of the housing to a second end of the housing, and the interior space is dimensioned to receive a wheelchair in an unfolded condition. The monument further includes a passenger crew area extending from the second interior wall to the longitudinal aisle, wherein the crew area is accessible from the longitudinal aisle and inaccessible from the interior space.

In at least some embodiments, the crew area includes at least one first storage compartment positioned in a space formed between the second interior wall and the longitudinal aisle, the at least one first storage compartment accessible from at least one of the first end and the second end of the housing, and at least one second storage compartment positioned in a space formed between the interior ceiling and the ceiling, the at least one second storage compartment accessible from the longitudinal aisle.

In at least some embodiments, the monument further includes a countertop positioned atop the at least one first storage compartment, the countertop spaced below the at least one second storage compartment, and the countertop accessible from the longitudinal aisle.

In at least some embodiments, the at least one first storage compartment is dimensioned to receive a galley cart.

According to a further aspect, the present disclosure is directed to a monument for installation in an aircraft passenger cabin having a floor, an overhead luggage bin, an outside wall, a longitudinal aisle, and a wheelchair securement space positioned adjacent to the longitudinal aisle and apart from the outside wall. In embodiments, the monument includes a housing configured to extend from the floor upwardly toward the overhead luggage bin, and from the outside wall toward the wheelchair securement space, the housing including a first wall positionable adjacent to the outside wall, a second wall positionable adjacent to the wheelchair securement space, first end wall extending between the first wall and the second wall, and a second end wall extending between the first wall and the second wall, and the housing including an interior space defined by the first wall, the second wall, the first wall, and the second end wall. At least one storage compartment is positioned in the interior space. A tray table assembly includes a rail mounted to the second wall and a tray table mounted to the rail, the tray table configured to deploy into the wheelchair securement space.

In at least some embodiments, the at least one storage compartment includes at least one first storage compartment accessible through at least one of the first end wall and the second end wall, and at least one second storage compartment accessible from the wheelchair securement space and through the second wall.

In at least some embodiments, the first wall is convex curved to match the curvature of the outside wall.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1A:
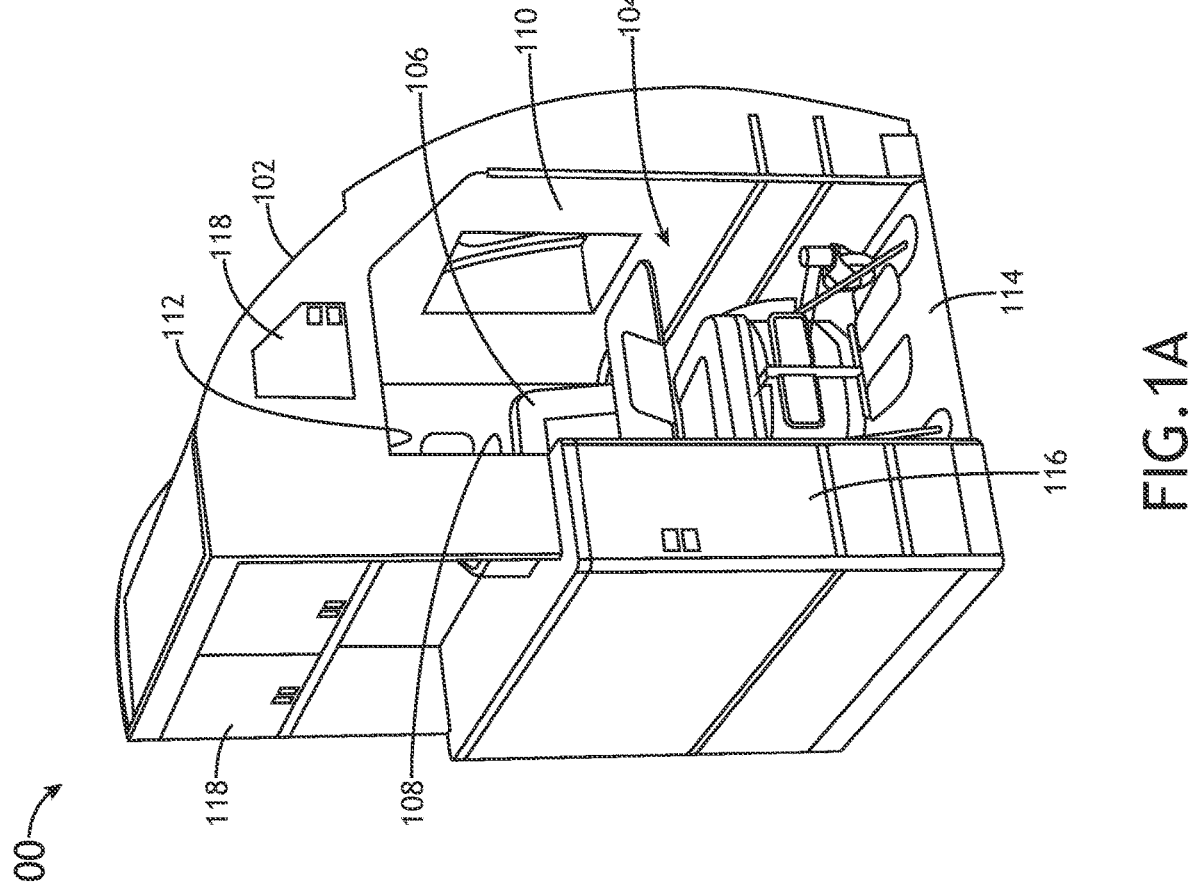
FIG. 1A is a front perspective view of a first multi-use monument having an interior space for accommodating a wheelchair, in accordance with one or more embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to multi-use monuments for installation in an aircraft passenger cabin. Each monument provides at least two functions, wherein the first function is wheelchair accommodation and the second function is unrelated to wheelchair accommodation. In embodiments, the second function may include, but is not limited to, food and beverage preparation, equipment stowage, and passenger amenity mounting. In embodiments, the second function may be exclusive use by the cabin crew or equipment for use by the cabin crew to serve the needs of passengers. In embodiments, the first function is achieved by integrating a dedicated space within the monument dimensioned to receive and position an occupied wheelchair, such that a PRM can remain in their own wheelchair during TTOL. In embodiments, the monuments disclosed herein include means for securing a wheelchair in place in an unfolded condition, amenities for use by a PRM while positioned relative to the monument, and features enjoyed by a PRM such as direct access to a window.

Benefits of the multi-use monuments disclosed herein include, but are not limited to, dedicated space for accommodating an occupied wheelchair, monument reconfigurability for flexibility in designing passenger cabin configurations, obviating the need for transfer wheelchairs and PRM wheelchair transfers, maximizing seating density, little to no impact on conventional aircraft passenger cabin floorplans, and enhanced comfort and travel experience for a PRM.

Figure 1B:
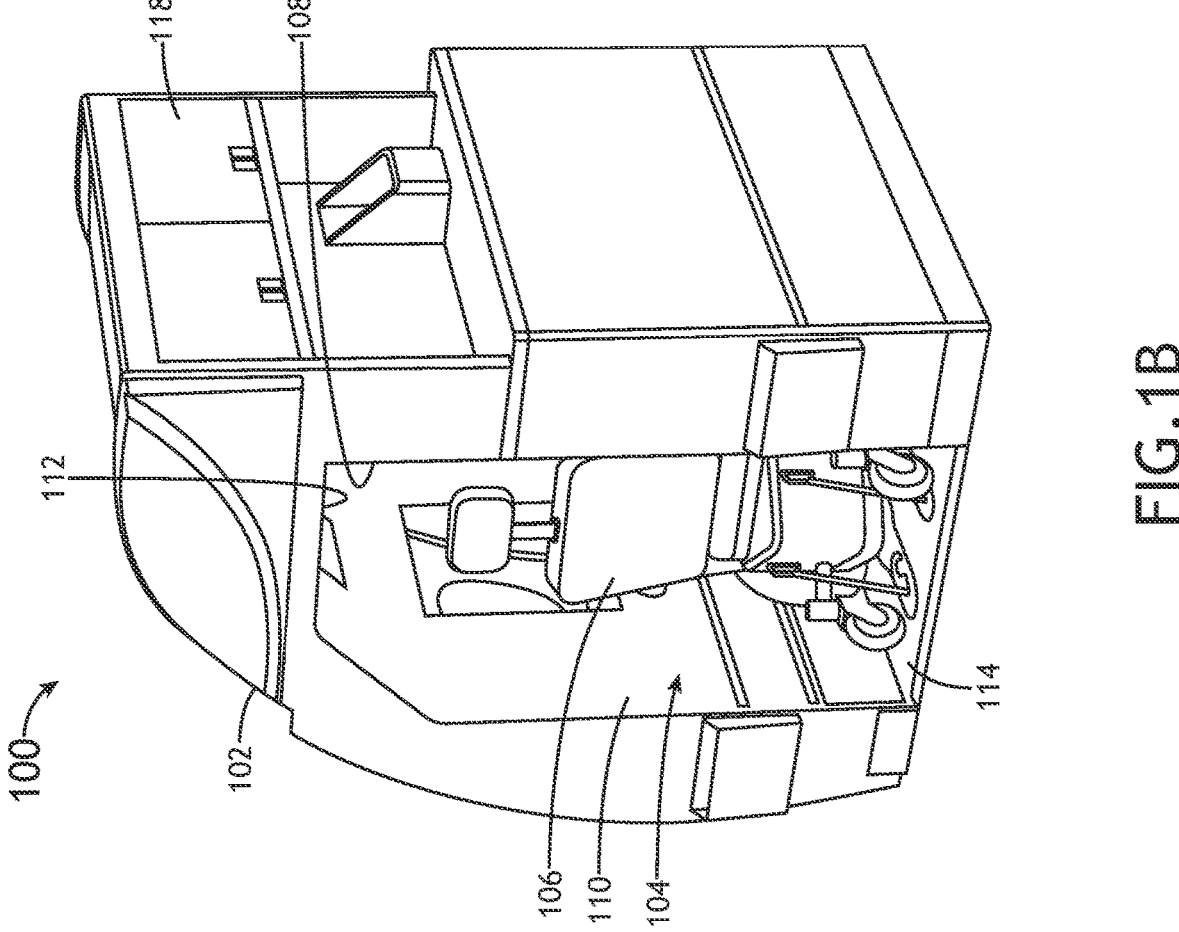
FIG. 1B is a rear perspective view of the monument shown in FIG. 1A, in accordance with one or more embodiments of this disclosure.
Figure 1C:
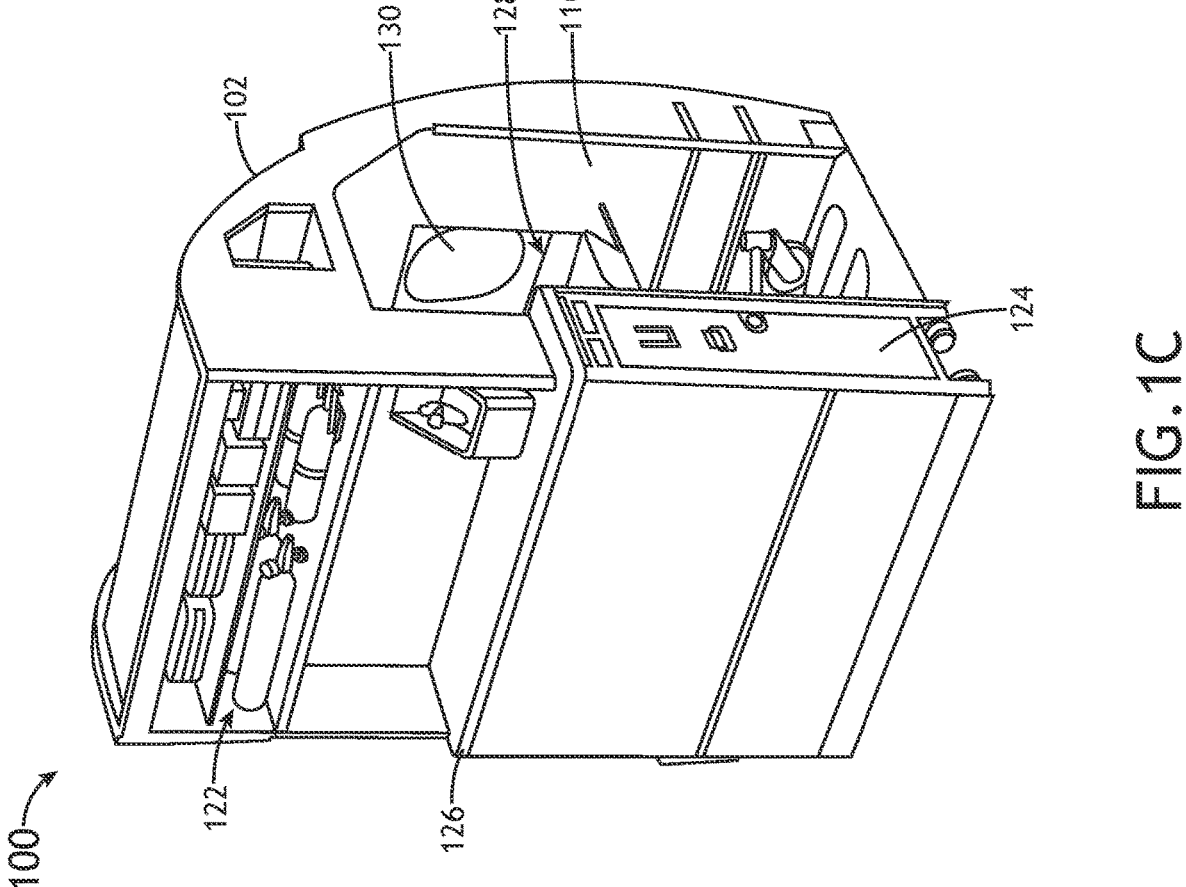
FIG. 1C is an aisle side perspective view of the monument shown in FIG. 1A, in accordance with one or more embodiments of this disclosure.

FIGS. 1A-1C illustrate a multi-use monument 100, in accordance with one or more embodiments of this disclosure. The multi-use monument 100 includes a housing 102 having a front, a back, a first side, a second side, a top, and a bottom. In at least some embodiments, when installed in an aircraft passenger cabin, the front may correspond to a forward-facing end, the back may correspond to a rear-facing end, the first side may correspond to an aisle-facing side, and the second side may correspond to an exterior wall (e.g., fuselage) facing side. In at least some embodiments, the housing 102 may extend vertically from the floor to the cabin ceiling, and horizontally from an exterior wall to a longitudinal aisle. As shown, the second side and at least a portion of the top may be convex curved to substantially correspond to the curvature of the fuselage.

An interior space 104 is formed within the housing 102 and is dimensioned to receive and position a wheelchair 106 in an unfolded state, for instance a wheelchair occupied by a PRM. The interior space 104, which may be formed as a tunnel, extends along the longitudinal length of the monument 100 from the front of the housing 102 to the back of the housing 102. The interior space 104 may be open at both ends to provide a first entrance positioned at the front and a second entrance positioned at the back. In this configuration, a wheelchair 106 may enter and exit the interior space 104 from either end, and the wheelchair may be positioned forward-facing or rear-facing depending on one or more of passenger preference, configuration of the wheelchair securement means, position of the monument 100 relative to a lateral aisle, position of the monument 100 relative to an exit, etc.

The interior space 104 is defined by a first interior wall 108 positioned adjacent to the first side, a second interior wall 110 positioned adjacent to the second side, and a ceiling 112 positioned adjacent to the top of the housing 102. In embodiments in which the monument 100 includes an integrated floor 114, the interior space may be further defined by the floor 114. Various compartments, recesses, openings, etc., may be positioned within the housing 102, and may be left open or covered with a latching door. For example, at least one first compartment 116 may be positioned between the first interior wall 108 and the first side, and at least one second compartment 118 may be positioned between the ceiling 112 and the cabin ceiling. Further compartments may be positioned between the second interior wall 110 and the second side. In embodiments, the at least one first compartment 116 and the at least one second compartment 118 may be accessible from at least one of the longitudinal aisle and the ends of the monument 100, but may be inaccessible from within the interior space 104. In this configuration, physical separation is provided such that the cabin crew is able to make use of the compartments while a PRM in the interior space has no access to the compartments.

Interior compartments formed within the housing 102 may be located and dimensioned based on the articles intended to be stowed therein to provide customizable stowage solutions. For example, upper compartments positioned adjacent to the ceiling may be used to stow occasional use items such as emergency items including, but not limited to, resuscitators, first aid kits, oxygen bottles, demo kits, radio beacons, oxygen boxes, halon fire extinguishers, and megaphones, whereas lower compartments may be used to stow regular use items such as blankets, pillows, headphones, and cleaning supplies.

FIG. 1C illustrates an exemplary embodiment in which upper compartments are used to stow emergency use items 122, while lower compartments are used to stow large items such as food and beverage carts 124. As shown, cart garages may be positioned and accessible at one or more ends of the monument 100 for stowing one or more food and beverage carts 124 between uses. In some embodiments, the monument 100 may include cart garages that are accessible at one or more ends of the housing 102, a countertop 126 positioned atop the cart garages which is accessible from the aisle, and upper compartments spaced above the countertop 126 also accessible from the aisle. In some embodiments, the first function may be wheelchair accommodation and the second function may be a galley.

The interior space 104 provides a dedicated place within the aircraft passenger cabin for positioning a PRM during TTOL and flight. The monument 100 may be customized to serve the specialized needs of a PRM. For example, equipment associated with a particular health condition may be housed within the monument 100 for use as needed. In some embodiments, a reading light, ventilation controller, and crew call button may be located in a passenger control unit mounted in the ceiling. In embodiments, emergency use equipment such as a deployable oxygen mask may be located in the ceiling. In embodiments, the second interior wall 110 may define an opening 128 for alignment with an exterior window 130, such that the PRM has direct window access to enhance the travel experience. In the case of a sufficient longitudinal length, the monument 100 may be equipped with at least two openings for alignment with at least two exterior windows.

Figure 1D:
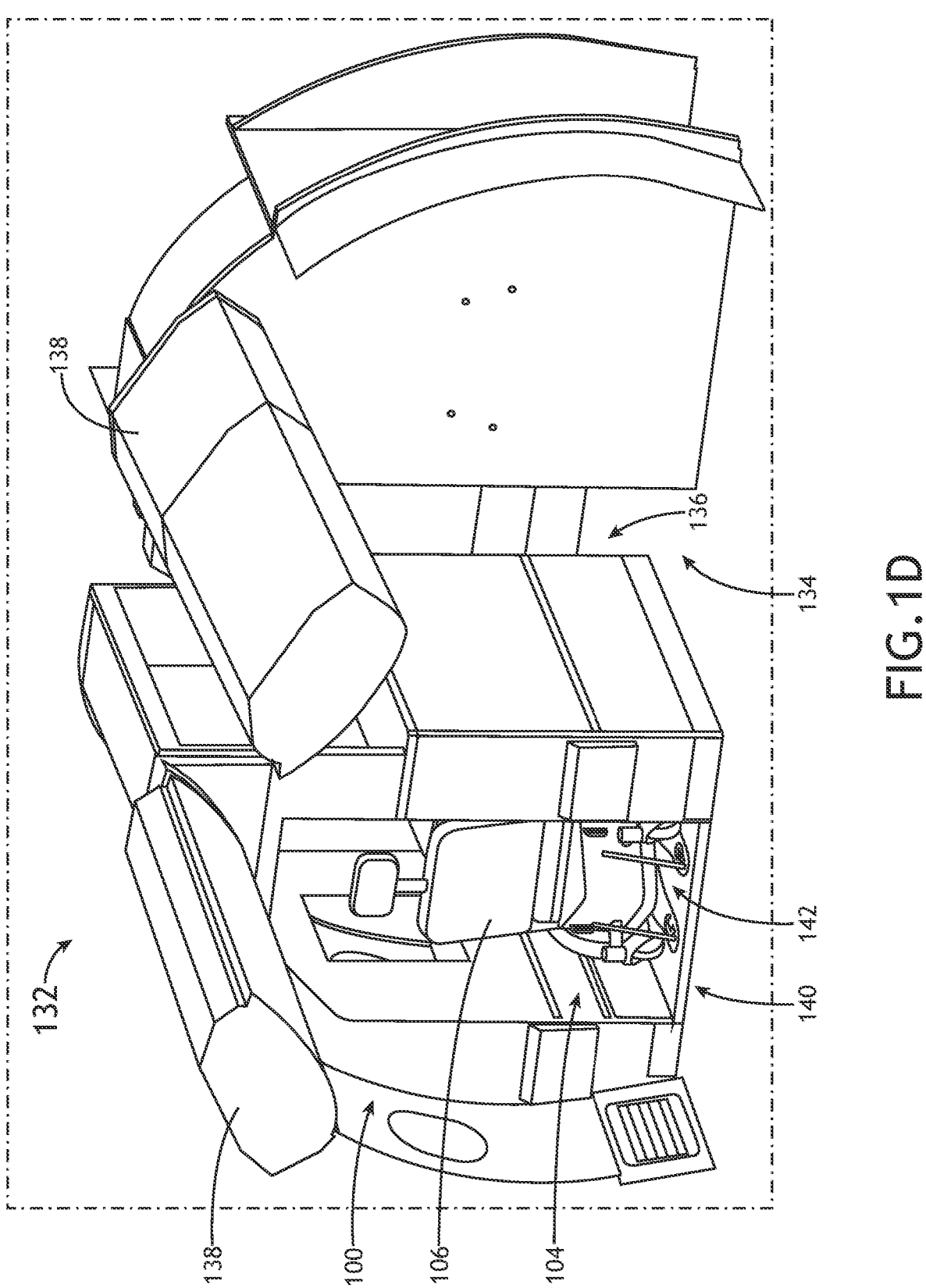
FIG. 1D is a perspective view of a portion of an aircraft passenger cabin equipped with the monument shown in FIG. 1A, in accordance with one or more embodiments of this disclosure.

FIG. 1D illustrates the monument 100 positioned in a portion of an aircraft passenger cabin 132. The passenger cabin 132 as shown includes a longitudinal aisle 134 oriented parallel to the aircraft longitudinal axis, a lateral aisle 136 extending from the longitudinal aisle to an exit door, and a plurality of overhead luggage bins 138. The passenger cabin shown is an exemplary configuration for a narrow body aircraft including a single center aisle. The monument 100 is shown positioned adjacent to the longitudinal aisle 134 on one side, adjacent to the exterior wall on the opposite side, and adjacent to the lateral aisle 136 at the front end. In this position, the forward end of the interior space 104 opens directly to the lateral aisle 136 such that the interior space 104 is nearest the exit door for entering and exiting the aircraft. In this configuration, it may not be necessary for the wheelchair 106 to make use of the longitudinal aisle 134. As such, the lateral aisle 136 can be dimensioned to accommodate the wheelchair 106 while the longitudinal aisle 134 can be made comparatively narrower to maximize passenger seating space and/or seating density.

In some embodiments, the cabin configuration 132 may further include a second lateral aisle 140, parallel to the first lateral aisle 136, positioned adjacent to the rear facing end of the monument 100. The first row of passenger seats (not shown) may be spaced apart from the monument 100 by a distance corresponding to the width of the second lateral aisle 140. In this configuration, a second aisle is provided to enter and exit the wheelchair 106 from the interior space 104. At least one passenger seat positioned in the first row of seats may be associated with the interior space 104, for instance reserved for a caregiver traveling with the PRM. In some embodiments, depending on the number of PRM spaces desired in the cabin, two monuments 100 may be positioned on opposite sides of the longitudinal aisle 134 in a symmetrical configuration. While both monuments 100 may include an interior space for accommodating a wheelchair, the second function for each monument may be different, e.g., galley versus stowage.

FIG. 1D further illustrates an assembly 142 for securing a wheelchair 106 in place within the interior space 104. In embodiments, the assembly 142 includes a platform for positioning on the cabin floor, at least one retractable tie-down mounted to the platform, and at least one tie-down strap for attachment between a respective tie-down and the wheelchair. In use, toe-downs and strap may be positioned at the front, back and sides of the wheelchair. In embodiments, the platform may be integrated into the cabin floor to eliminate a step-up/step-down.

Figure 2A:
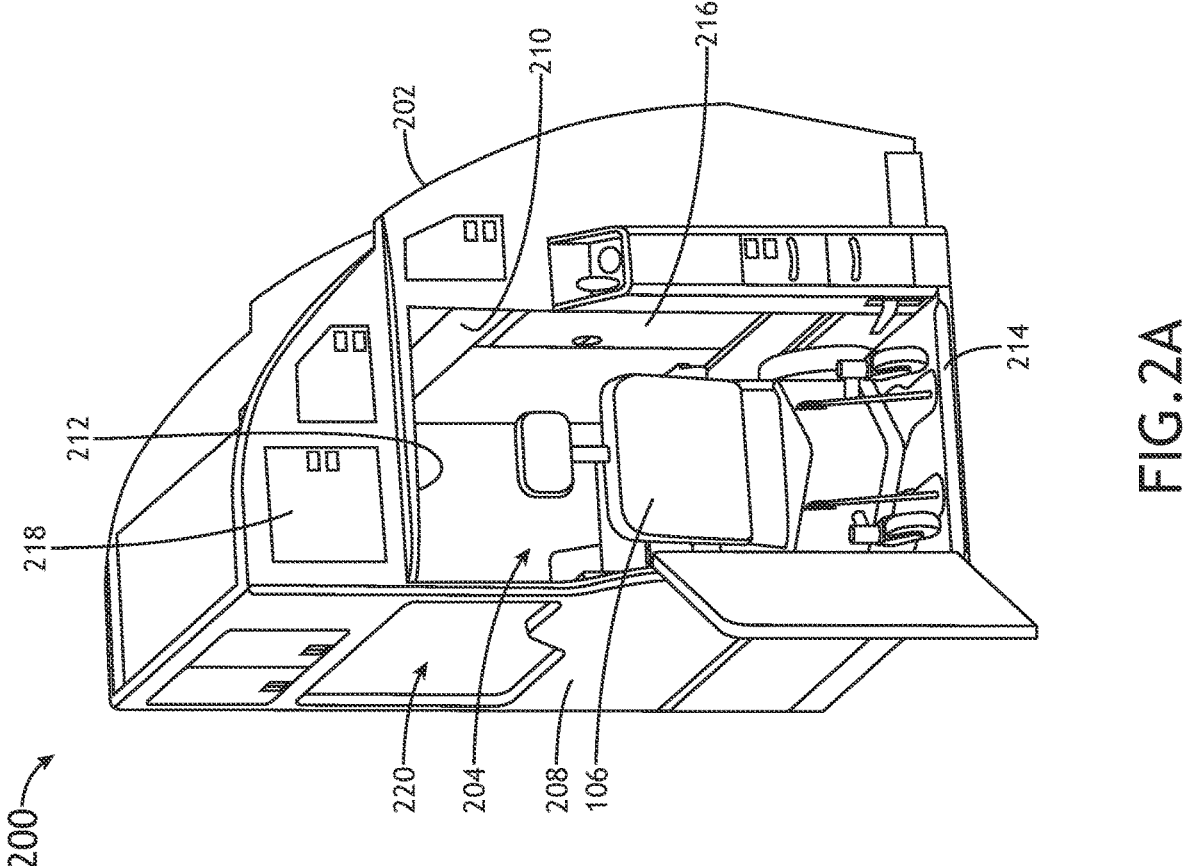
FIG. 2A is a front perspective view of a second multi-use monument having interior space for accommodating a wheelchair, in accordance with one or more embodiments of this disclosure.
Figure 2B:
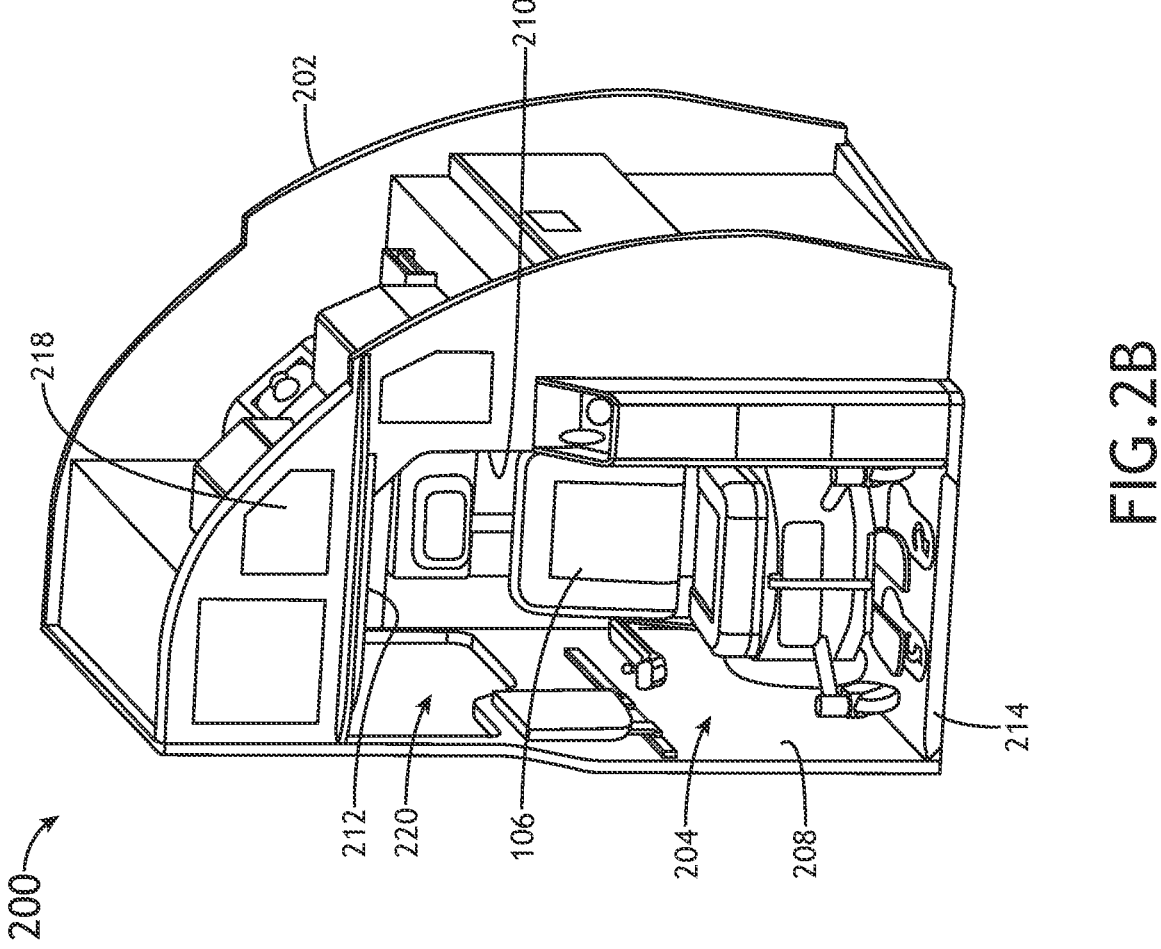
FIG. 2B is a fuselage side perspective of the monument shown in FIG. 2A, in accordance with one or more embodiments of this disclosure.

FIGS. 2A-2B illustrate another multi-use monument 200, in accordance with one or more embodiments of this disclosure. The multi-use monument 200 also includes a housing 202 having a front, a back, a first side, a second side, a top, and a bottom. In at least some embodiments, when installed in an aircraft passenger cabin, the front may correspond to a forward-facing end, the back may correspond to a rear-facing end, the first side may correspond to an aisle-facing side, and the second side may correspond to an exterior wall (e.g., fuselage) facing side. In at least some embodiments, the housing 202 may extend vertically from the floor to the cabin ceiling, and horizontally from an exterior wall to a longitudinal aisle. As shown, the second side and at least a portion of the top may be convex curved to substantially correspond to the curvature of the fuselage.

The monument 200 also includes an interior space 204 formed within the housing 202 and is dimensioned to receive and position a wheelchair 106 in an unfolded state, for instance a wheelchair occupied by a PRM. The interior space 204 also extends through the longitudinal length of the monument 200 from front to the back and may be open at both ends to provide a first entrance and a second entrance. As shown, the wheelchair 106 is oriented facing the rear.

The interior space 204 is also defined by a first interior wall 208, a second interior wall 210, and a ceiling 212. In embodiments in which the monument 200 includes an integrated floor 214, the interior space may be further defined by the floor 214. Various compartments, recesses, openings, etc., may be positioned within the housing 202, and may be left open or covered with a latching door. Like the first monument 100, at least one compartment 218 may be positioned between the ceiling and the top of the housing 202.

At least one first compartment 216 may be positioned between the second interior wall 210 and the second side of the housing 202, such that the at least one first compartment 216 is accessible from within the interior space 204. This configuration provides a comparatively thinner wall adjacent to the longitudinal aisle, eliminates lower compartments accessible at the longitudinal aisle, eliminates direct access to an exterior window, and introduces a window 220 positioned in the first interior wall and open to the longitudinal aisle.

Figure 2C:
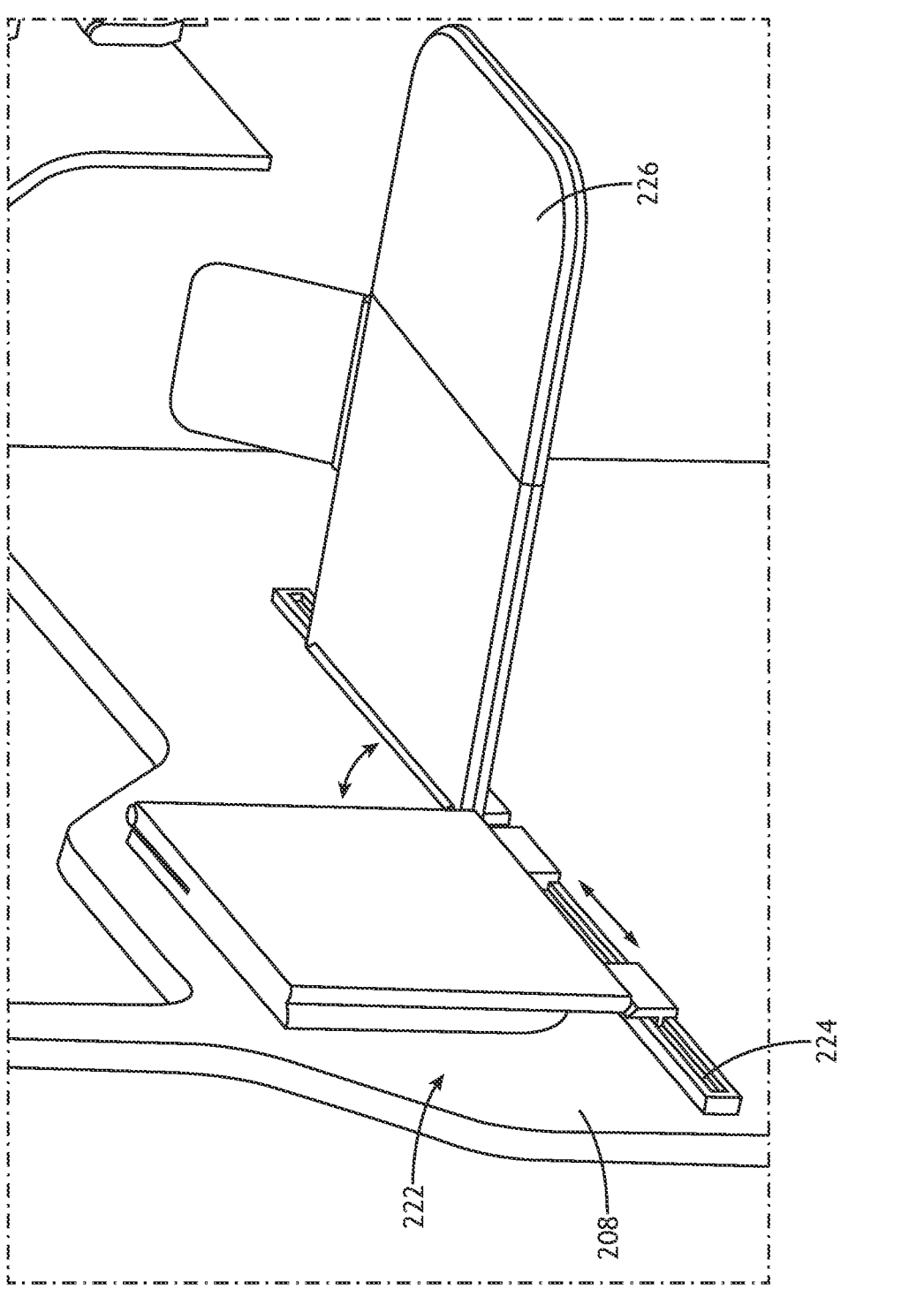
FIG. 2C is an enlarged perspective view of a tray table assembly for installation in the monuments of the present disclosure, in accordance with one or more embodiments of this disclosure.

FIG. 2C illustrates a tray table assembly 222 configured to be mounted for use within the interior space 204. In embodiments, the tray table assembly 222 includes a horizontal rail 224 configured to be mounted to an interior wall, for example the first interior wall 208. The horizontal rail 224 includes a track defining a horizontal motion path. At least one tray table 226 is slidably and/or rotatably mounted to the horizontal rail 224. In some embodiments, the at least one tray table 226 may be a bi-fold tray table. In use, each tray table 226 may be configured to unfold for use, fold for stowing, rotate toward horizontal for use, rotate toward vertical for stowing, and track horizontal to position the tray table as desired. The tray table assembly 222 is compatible for use with any of the monument embodiments according to the present disclosure.

Figure 2D:
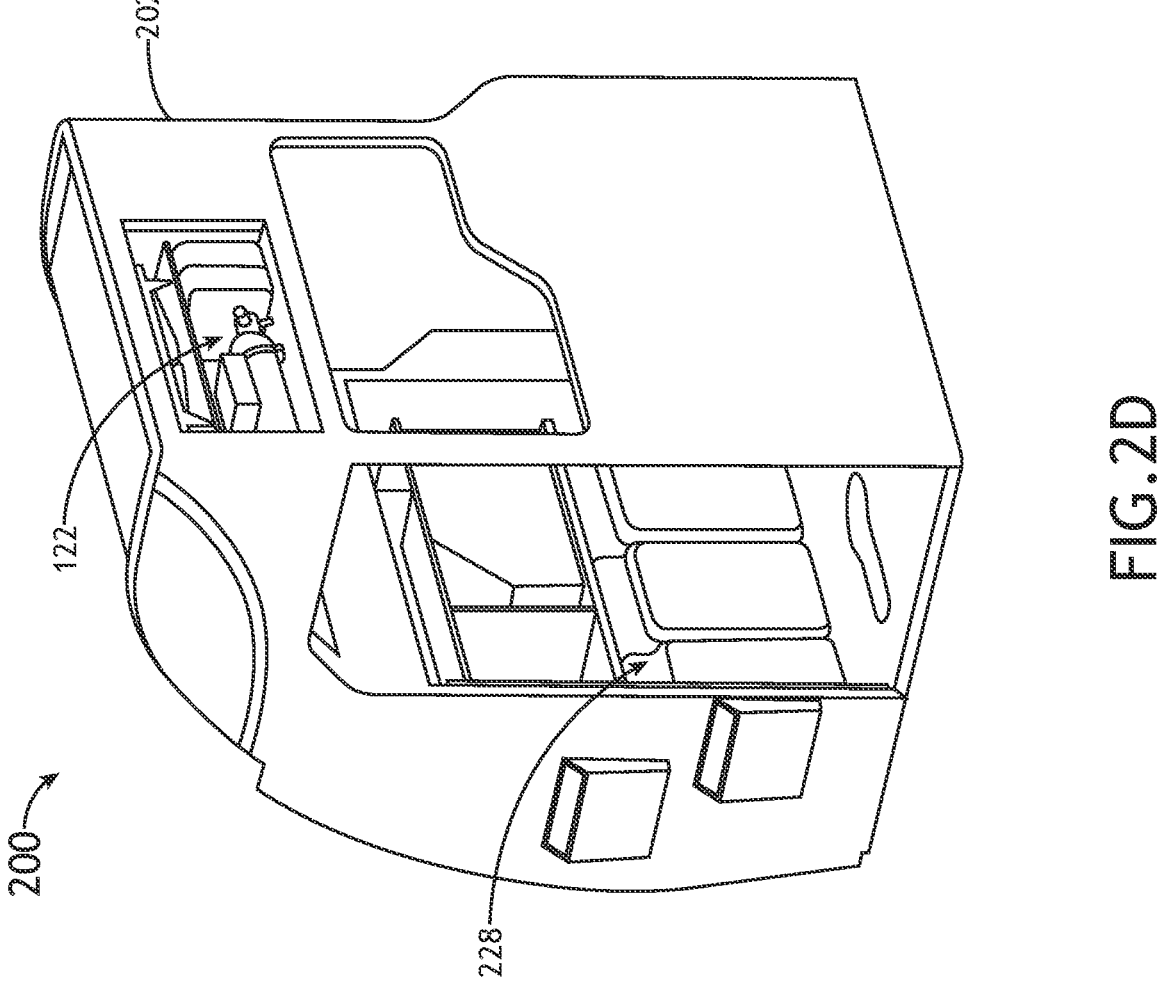
FIG. 2D is a rear perspective view of the monument shown in FIG. 2A, in accordance with one or more embodiments of this disclosure.

FIG. 2D illustrates interior compartments positioned within the housing 202 and dimensioned for use based on articles intended to be stowed therein. For example, upper compartments positioned adjacent to the ceiling and accessible from the longitudinal aisle may be used to stow occasional use items such as emergency items 122 including, but not limited to, resuscitators, first aid kits, oxygen bottles, demo kits, radio beacons, oxygen boxes, halon fire extinguishers, and megaphones, whereas the compartments accessible from within the interior space may be used to stow items such as luggage 228 belonging to the of the cabin crew and/or the PRM, equipment associated with a particular health condition of the PRM for use as needed, etc.

Figure 2E:
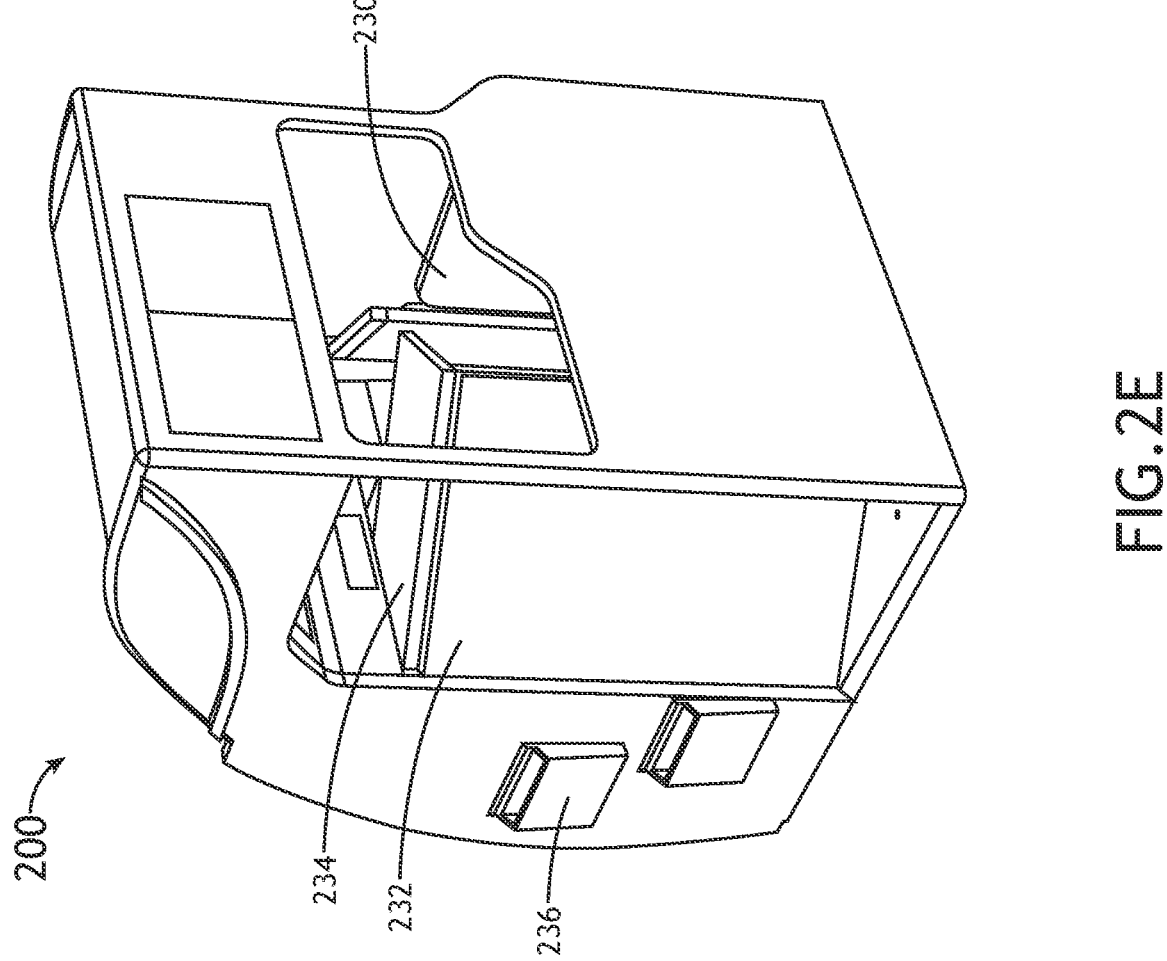
FIG. 2E is a rear perspective view of the monument shown in FIG. 2A illustrating a swinging door, in accordance with example embodiments of this disclosure.

FIG. 2E illustrates a particular configuration of the monument 200 including a first door 230 associated with the first entrance and a second door 232 associated with the second entrance. In embodiments, the doors 230, 232 may swing or slide, and at least one of the doors may include a table 234 mounted to the door and configured to rotate into position for use and stow against the door between uses. In embodiments, literature pockets 236 and other amenities may be mounted to the monument for use by passengers seated facing the monument.

Figure 2F:
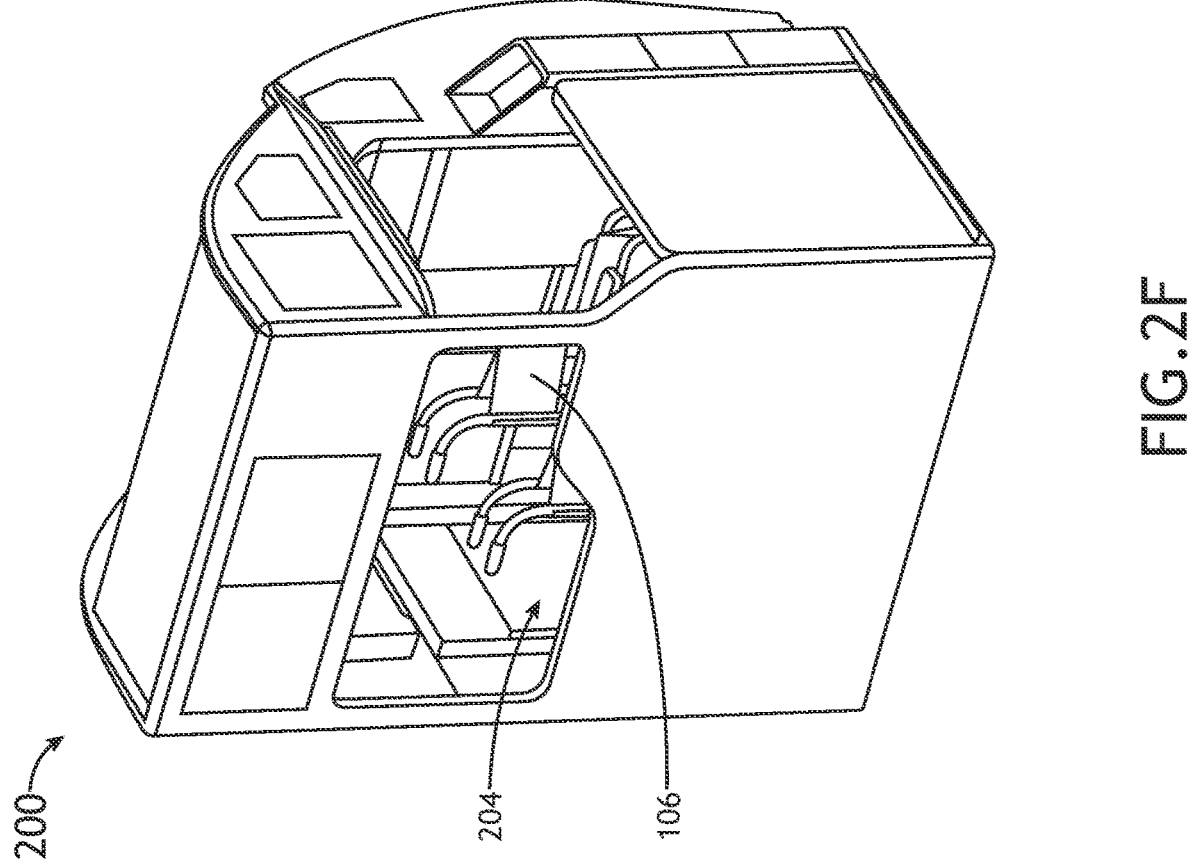
FIG. 2F is an aisle side perspective view of the monument shown in FIG. 2A illustrating wheelchair stowage, in accordance with one or more embodiments of this disclosure.
Figure 2G:
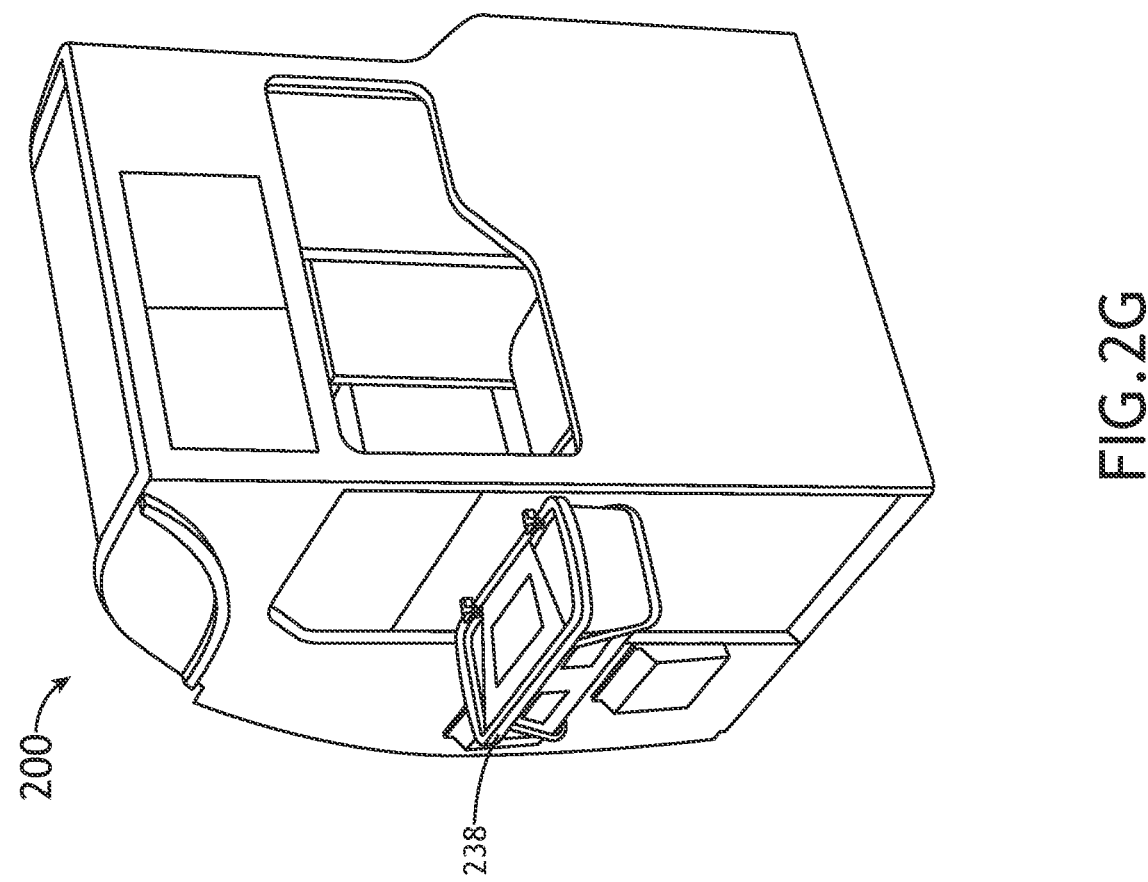
FIG. 2G is a rear perspective view of the monument shown in FIG. 2A illustrating a mountable bassinet, in accordance with one or more embodiments of this disclosure.

FIG. 2F illustrates the interior space 204 of the monument 200 being utilized to stow more than one wheelchair 106, with each stowed wheelchair 106 in a folded state. In some embodiments, the monument 200 may be accessorized. FIG. 2G illustrates a bassinet 238 mounted to an exterior wall of the monument 200, for example an end wall or door facing the first seat row (not shown).

Figure 3A:
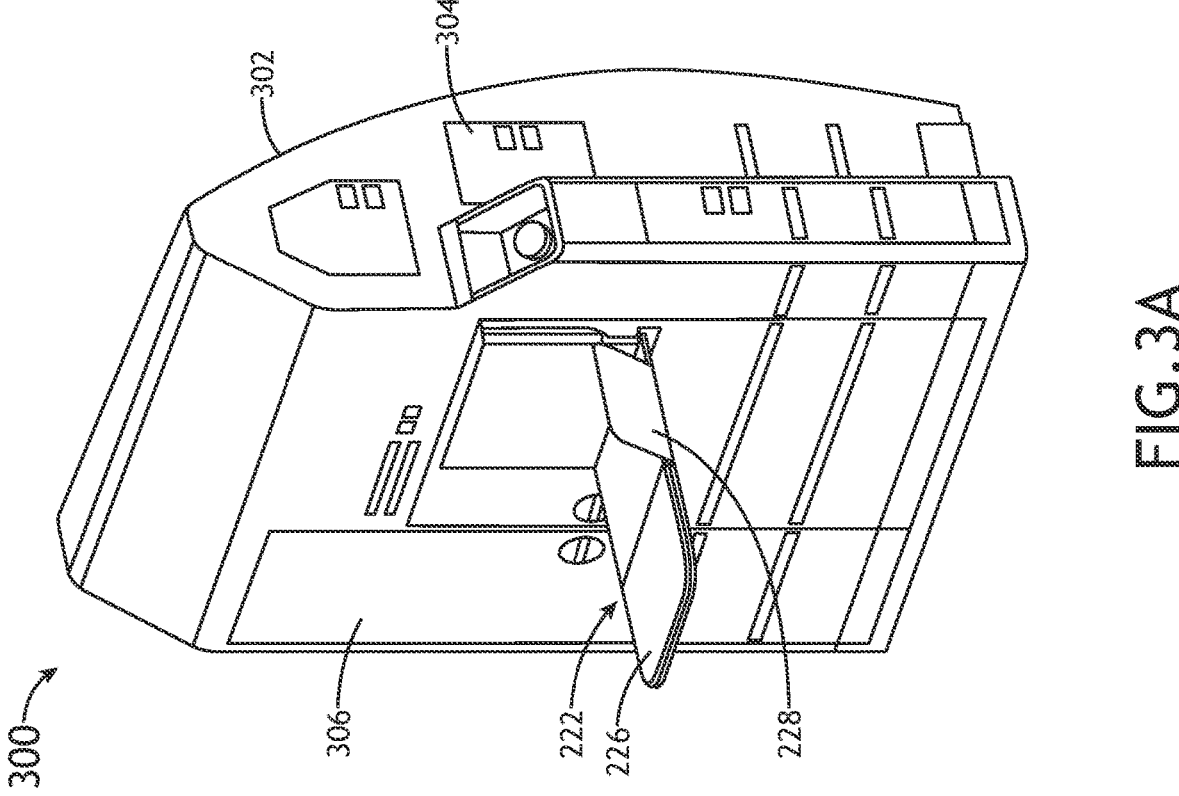
FIG. 3A is a front perspective view of a third multi-use monument for use adjacent a dedicated wheelchair space, in accordance with one or more embodiments of this disclosure.

FIG. 3A illustrates a further multi-use monument 300, in accordance with one or more embodiments of this disclosure. The multi-use monument 300 includes a housing 302 also having a front, a back, a first side, a second side, a top, and a bottom. In at least some embodiments, when installed in an aircraft passenger cabin, the front may correspond to a forward-facing end, the back may correspond to a rear-facing end, the first side may correspond to an aisle-facing side, and the second side may correspond to an exterior wall (e.g., fuselage) facing side. In at least some embodiments, the housing 302 may extend vertically from the floor toward the cabin ceiling, and horizontally from an exterior wall toward a longitudinal aisle. As shown, the second side and at least a portion of the top may be convex curved to substantially correspond to the curvature of the fuselage.

The monument 300 is configured to be positioned to one side of a dedicated space for accommodating a wheelchair. In embodiments, the monument 300 includes internal compartments 304 accessible from at least one end of the housing 302, and internal compartments 306 accessible from the first side of the housing 302. The internal compartments 304, 306 may be dimensioned according to their relative position within the housing and items to be stowed in the monument 300. In embodiments, a tray table assembly, for instance the tray table assembly 222 discussed above, may be mounted to the first side such that tray table 226 deploys toward the longitudinal aisle. In some embodiments, the tray table assembly 222 may include a deployable device holder 228 rotatably attached to the tray table 226.

Figure 3B:
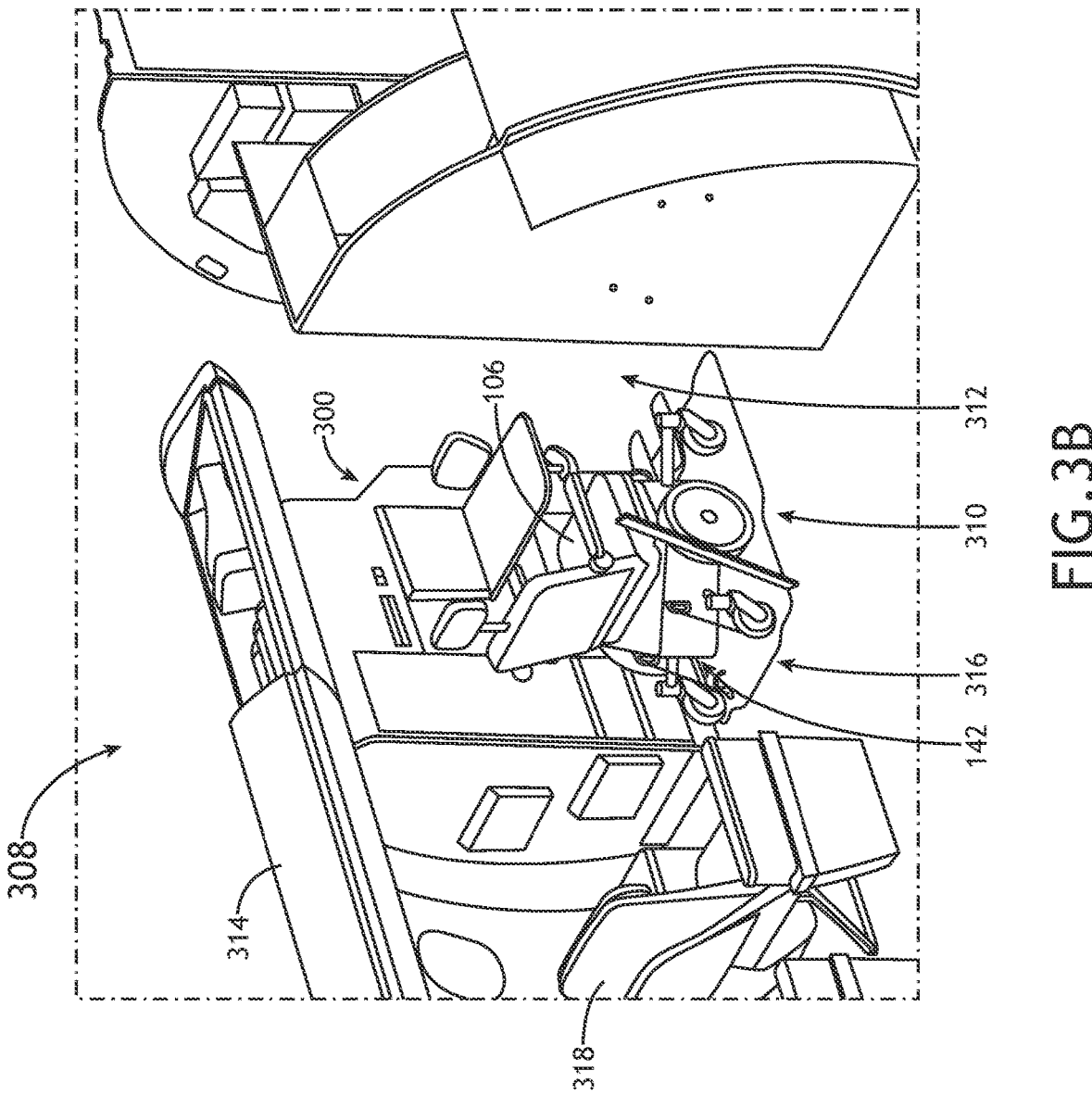
FIG. 3B is a perspective view of a portion of an aircraft passenger cabin equipped with the monument shown in FIG. 3A, in accordance with one or more embodiments of this disclosure.

FIG. 3B illustrates the monument 300 positioned in a portion of an aircraft passenger cabin 308. The passenger cabin 308 as shown includes a longitudinal aisle 310 oriented parallel to the aircraft longitudinal axis, a lateral aisle 312 extending from the longitudinal aisle to an exit door (not shown), and a plurality of overhead luggage bins 314. The passenger cabin shown is an exemplary configuration for a narrow body aircraft including a single center aisle. The monument 300 is shown positioned to one side of the longitudinal aisle 310, adjacent to the exterior wall, adjacent to the lateral aisle 312 at the front end, and adjacent to a dedicated wheelchair parking space 316 adjacent to each of the longitudinal aisle 310 and the lateral aisle 312. In this configuration, the wheelchair parking space 316 flows directly into each of the longitudinal aisle 310 and the lateral aisle 312 nearest the exit door for entering and exiting the aircraft.

In some embodiments, the monument 300 may be dimensioned to fit directly below one or more overhead luggage bins 314. The first row of passenger seats 318 may be spaced apart from the monument 300 by a predefined distance, and at least one passenger seat positioned in the first row of seats 318 may be associated with the interior space wheelchair parking space 316, for instance reserved for a caregiver traveling with the PRM. In some embodiments, depending on the number of PRM spaces desired in the cabin, two monuments 300 may be positioned on opposite sides of the longitudinal aisle 310 in a symmetrical configuration. While both monuments 300 may include features for serving a PRM, the second function for each monument may be different, e.g., galley versus stowage. FIG. 3B further illustrates the assembly 142 for securing a wheelchair 106 in place as discussed above.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A monument for installation in an aircraft passenger cabin having a floor, a ceiling, an outside wall, and a longitudinal aisle, the monument comprising:

a housing configured to extend from the floor upwardly toward the ceiling, and from the outside wall toward the longitudinal aisle;

an interior space formed in the housing, the interior space defined by a first interior wall positioned adjacent to the outside wall, a second interior wall positioned adjacent to the longitudinal aisle, and an interior ceiling positioned adjacent to the ceiling, the interior space extending from a first end of the housing to a second end of the housing, and the interior space dimensioned to receive a wheelchair in an unfolded condition;

at least one entrance into the interior space through at least one of the first end of the housing and the second end of the housing;

a securement assembly positionable on the floor, the securement assembly configured to secure the wheelchair in place within the interior space; and at least one storage compartment positioned in the housing.

2. The monument according to claim 1, wherein the first interior wall defines an opening to a window positioned in the outside wall.

3. The monument according to claim 1, wherein the at least one storage compartment comprises:

at least one first storage compartment positioned in a space formed between the second interior wall and the longitudinal aisle, the at least one first storage compartment accessible from at least one of the first end and the second end of the housing; and at least one second storage compartment positioned in a space formed between the interior ceiling and the ceiling, the at least one second storage compartment accessible from the longitudinal aisle.

4. The monument according to claim 3, further comprising a countertop positioned atop the at least one first storage compartment, the countertop spaced below the at least one second storage compartment, and the countertop accessible from the longitudinal aisle.

5. The monument according to claim 4, wherein none of the at least one first storage compartment, the at least one second storage compartment, and the countertop are accessible from within the interior space.

6. The monument according to claim 3, wherein the at least one first storage compartment is dimensioned to receive a galley cart.

7. The monument according to claim 1, wherein the at least one storage compartment comprises:

at least one first storage compartment positioned in a space formed between the first interior wall and the outside wall, the at least one first storage compartment being accessible from within the interior space; and at least one second storage compartment positioned in the space formed between the interior ceiling and the ceiling, the at least one second storage compartment accessible from the longitudinal aisle and at least one of the first end and the second end of the monument.

8. The monument according to claim 1, further comprising:

a first entrance positioned at the first end of the housing;

a first door positioned at the first entrance;

a second entrance positioned at the second end of the housing; and a second door positioned at the second entrance.

9. The monument according to claim 1, wherein the second interior wall comprises a window open from the interior space to the longitudinal aisle.

10. The monument according to claim 1, further comprising a tray table assembly positioned in the interior space, the tray table assembly comprising a rail mounted to at least one of the first interior wall and the second interior wall, and at least one deployable tray table mounted to the rail.

11. The monument according to claim 1, wherein the interior space is dimensioned to receive at least two wheelchairs each in a folded condition.

12. A monument for installation in an aircraft passenger cabin having a floor, a ceiling, an outside wall, and a longitudinal aisle, the monument comprising:

a housing configured to extend from the floor upwardly toward the ceiling, and from the outside wall toward the longitudinal aisle;

an interior space formed in the housing, the interior space defined by a first interior wall positioned adjacent to the outside wall, a second interior wall positioned adjacent to the longitudinal aisle, and an interior ceiling positioned adjacent to the ceiling, the interior space extending from a first end of the housing to a second end of the housing, and the interior space dimensioned to receive a wheelchair in an unfolded condition;

at least one entrance into the interior space through at least one of the first end of the housing and the second end of the housing;

a securement assembly positionable on the floor, the securement assembly configured to secure the wheelchair in place within the interior space; and a crew area extending from the second interior wall to the longitudinal aisle, the crew area accessible from the longitudinal aisle and inaccessible from the interior space.

13. The monument according to claim 12, wherein the first interior wall defines an opening to a window positioned in the outside wall.

14. The monument according to claim 12, wherein the crew area comprises:

at least one first storage compartment positioned in a space formed between the second interior wall and the longitudinal aisle, the at least one first storage compartment accessible from at least one of the first end and the second end of the housing; and at least one second storage compartment positioned in a space formed between the interior ceiling and the ceiling, the at least one second storage compartment accessible from the longitudinal aisle.

15. The monument according to claim 14, further comprising a countertop positioned atop the at least one first storage compartment, the countertop spaced below the at least one second storage compartment, and the countertop accessible from the longitudinal aisle.

16. The monument according to claim 14, wherein the at least one first storage compartment is dimensioned to receive a galley cart.

17. The monument according to claim 12, further comprising a tray table assembly positioned in the interior space, the tray table assembly comprising a rail mounted to at least one of the first interior wall and the second interior wall, and at least one deployable tray table mounted to the rail.

18. A monument for installation in an aircraft passenger cabin having a floor, an overhead luggage bin, an outside wall, a longitudinal aisle, and a wheelchair securement space positioned adjacent to the longitudinal aisle and apart from the outside wall, the monument comprising:

a housing configured to extend from the floor upwardly toward the overhead luggage bin, and from the outside wall toward the wheelchair securement space, the housing including a first wall positionable adjacent to the outside wall, a second wall positionable adjacent to the wheelchair securement space, first end wall extending between the first wall and the second wall, and a second end wall extending between the first wall and the second wall, and the housing including an interior space defined by the first wall, the second wall, the first wall, and the second end wall;

at least one storage compartment positioned in the interior space; and a tray table assembly including a rail mounted to the second wall and a tray table mounted to the rail, the tray table configured to deploy into the wheelchair securement space.

19. The monument according to claim 18, wherein the at least one storage compartment comprises:

at least one first storage compartment accessible through at least one of the first end wall and the second end wall; and at least one second storage compartment accessible from
the wheelchair securement space and through the sec-
ond wall.

20. The monument according to claim 18, wherein the
first wall is convex curved to match a curvature of the
outside wall.

\* \* \* \* \*